United States Patent [19]

Ko

[11] Patent Number: 5,713,391
[45] Date of Patent: Feb. 3, 1998

[54] WATER TEMPERATURE SETTING STRUCTURE OF A COMBINATION FAUCET

[75] Inventor: Hsi-Chia Ko, Changhua Hsien, Taiwan

[73] Assignee: Chung Cheng Faucet Co., Ltd., Changhua Hsien, Taiwan

[21] Appl. No.: 752,524

[22] Filed: Nov. 20, 1996

[51] Int. Cl.⁶ ............................................. F16K 11/074
[52] U.S. Cl. ............................... 137/625.4; 251/285
[58] Field of Search .......................... 251/285; 137/625.4

[56] References Cited

U.S. PATENT DOCUMENTS 4,089,347  5/1978  Christo ........................... 251/285 X Primary Examiner—John Fox
Attorney, Agent, or Firm—Bacon & Thomas

[57] ABSTRACT

A water temperature setting structure of combination faucet, including a temperature setting sleeve and an adjustment bolt. The temperature of discharged water can be quickly directly set by the temperature setting sleeve and the adjustment bolt. In the case that the setting is not completed yet, a user only needs to microadjust the adjustment bolt through a small distance so as to quickly set the temperature of discharged water. Once the adjustment bolt is loosened, the temperature setting projection is only moved forward through a small distance and stopped by the right side of the engaging block so that the water temperature will be not excessively increased so as to avoid scading of the user.

3 Claims, 4 Drawing Sheets

WATER TEMPERATURE SETTING STRUCTURE OF A COMBINATION FAUCET

BACKGROUND OF THE INVENTION

The present invention relates to a water temperature setting structure of combination faucet, including a temperature setting sleeve and an adjustment bolt. The temperature of discharged water can be quickly directly set by the temperature setting sleeve and the adjustment bolt. In the case that the setting is not completed yet, a user only needs to microadjust the adjustment bolt through a small distance so as to quickly set the temperature of discharged water. Once the adjustment bolt is loosened, the temperature setting projection is only moved forward through a small distance and stopped by the right side of the engaging block so that the water temperature will be not excessively increased so as to avoid scading of the user.

SUMMARY OF THE INVENTION

It is a primary object of the present invention to provide a water temperature setting structure of combination faucet, including a temperature setting sleeve and an adjustment bolt. The temperature of discharged water can be quickly directly set by the temperature setting sleeve and the adjustment bolt. The restricting ribs of the fitting hole of the temperature setting sleeve are engaged with the restricting ribs of the fitting section of the stem to locate the same. The more the restricting ribs of the fitting section of the stem and the restricting ribs of the filling hole of the temperature selling sleeve are, the smaller the angle of each adjustment contained by two restricting ribs is, whereby the locating projection of the temperature setting sleeve can directly contact with the right side of the engaging block of the cover member so as to quickly and easily set the water temperature without considering whether the adjustment bolt is loosened.

It is a further object of the present invention to provide the above water temperature setting structure in which in the case that the restricting ribs of the fitting hole of the temperature setting sleeve are engaged with the restricting ribs of the fitting section of the stem by such an angle as not to contact with the right side of the engaging block of the cover member, a user only needs to microadjust the adjustment bolt through a small distance so as to quickly set the temperature of discharged water.

It is still a further object of the present invention to provide the above water temperature setting structure in which once the adjustment bolt is collided by the engaging block and loosened, when the temperature setting projection is further advanced to increase the water temperature, the projection is only moved forward through a small distance and stopped by the right side of the engaging block so that the water temperature will be not excessively increased so as to avoid scading of the user.

The present invention can be best understood through the following description and accompanying drawings, wherein:

DETAILED DESCRIPTION OF THE PREFERRED EMBODIMENT

Figure 1:
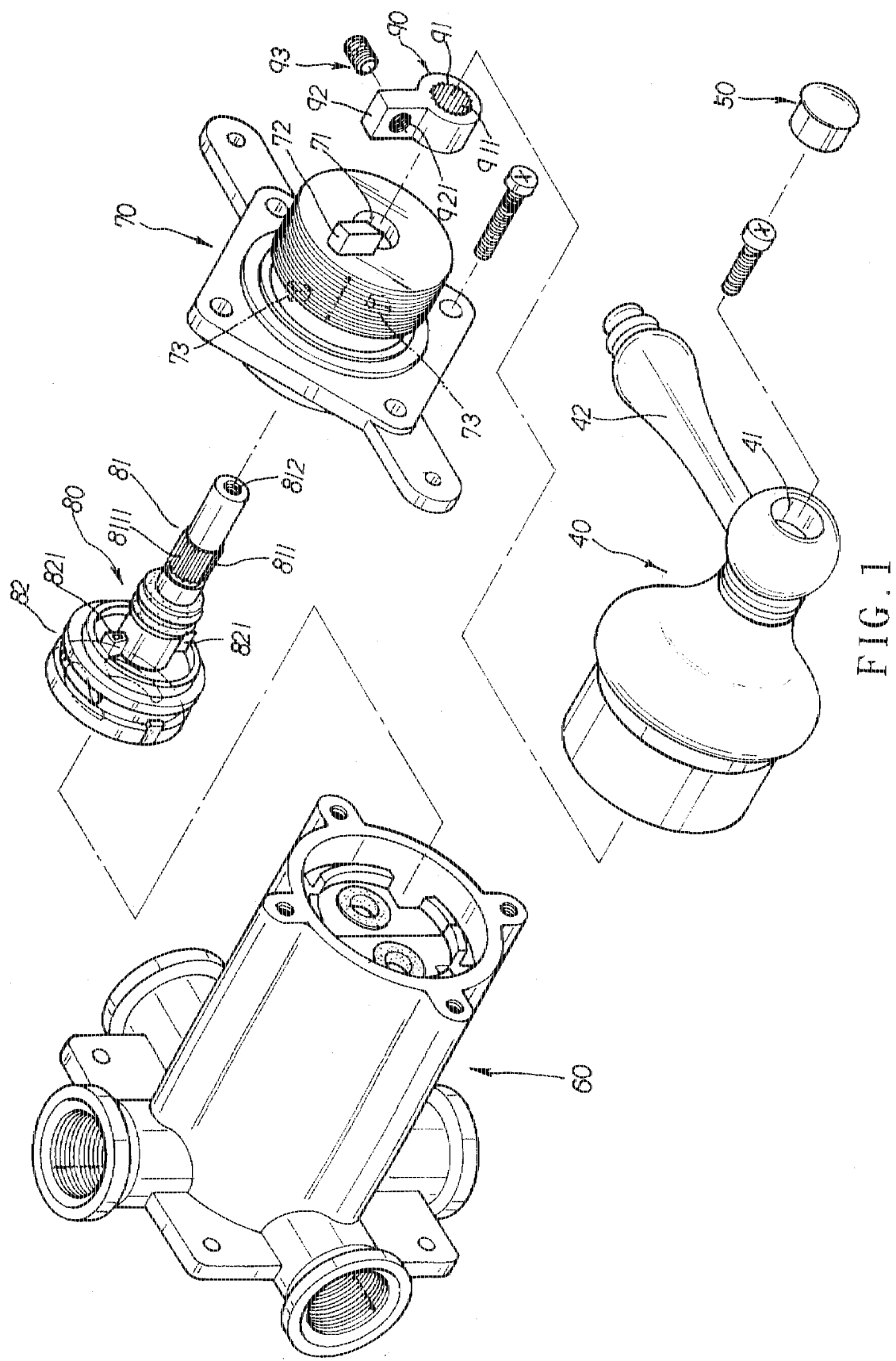
FIG. 1 is a perspective exploded view of the present invention.

Please refer to FIG. 1. The present invention includes a combination faucet body 60, a cover member 70, a controlling valve 80, a temperature setting sleeve 90, an adjustment bolt 93, a handle knob 40 and a decorative cap 50. The front face of the cover member 70 is formed with a central through hole 71. An engaging block 72 is disposed above the through hole 71. The middle step of three steps of rear face of the cover member 70 is disposed with two opposite projecting blocks 73. The middle section of the valve stem 81 of the controlling valve 80 is disposed with a fitting section 811 formed with multiple axial restricting ribs 8111. The head of the stem 81 is formed with a thread hole 812. The rear end of the stem 81 is connected with a cold/hot water combination chamber 82 the top face of which is disposed with two opposite restricting blocks 821. The center of the end face of the temperature setting sleeve 90 is disposed with a fitting hole 91 the inner wall of which is formed with multiple axial restricting ribs 911. A temperature setting projection 92 extends from the periphery of the temperature setting sleeve 90, which is formed with a thread hole 921 on lateral side. A stepped hole 41 is formed on the end of the head of the handle knob 40. A handle 42 extends from lateral side of the head of the handle knob.

Figure 2:
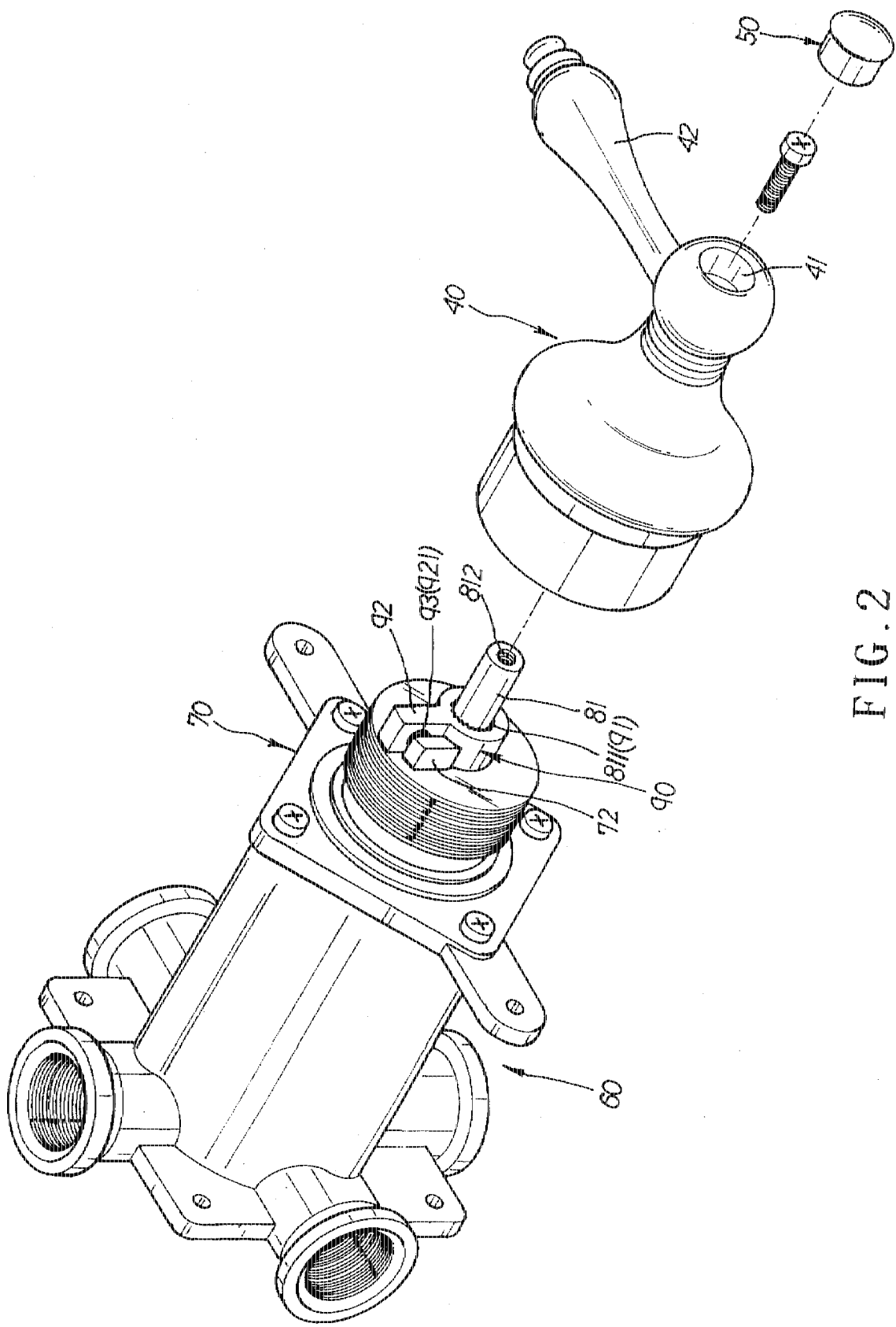
FIG. 2 is a partially assembled view of the present invention.

Referring to FIG. 2, when setting the temperature of the discharged water, the stem 81 is first passed through the through hole 71 of the cover member 70 with the front and middle sections of the stem 81 protruding out of the front end of the cover member 70. At this time, the two restricting blocks 821 of the controlling valve 80 are interlacedly positioned between the two projecting blocks 73 of the rear end of the cover member 70 so as to preliminarily determine the proper travel range for measuring the desired water temperature. Then the combination faucet body 10 is covered by the cover member 70 which is secured thereon by screws. Then the handle knob 40 is fitted onto the front section of the stem 81 and the handle 42 is rotated to drive the stem 81 within the proper travel range so as to quickly rotate the handle to the necessary temperature of the discharged water. After the necessary water temperature is set, the handle knob 40 is extracted from the stem 81 and the fitting section 811 of the stem 81 is fitted into the fitting hole 91 of the temperature sleeve 90 by such an angle as to contact with right side of the engaging block 72 of the cover member 70. At this time, the restricting ribs 911 of the fitting hole 91 are engaged with the restricting ribs 8111 of the fitting section 811 to locate the same. The temperature setting projection 92 contacts with or is positioned at a position closest to the right side of the engaging block 72. Then the adjustment bolt 93 is passed through the thread hole 921 of the temperature setting projection 92. In case the projection 92 does not contact with the right side of the engaging block 72 yet, the adjustment bolt 93 is microadjusted with its rear end abutting against the right side of the engaging block 72 to complete the setting of the temperature of discharged water.

Figure 3:
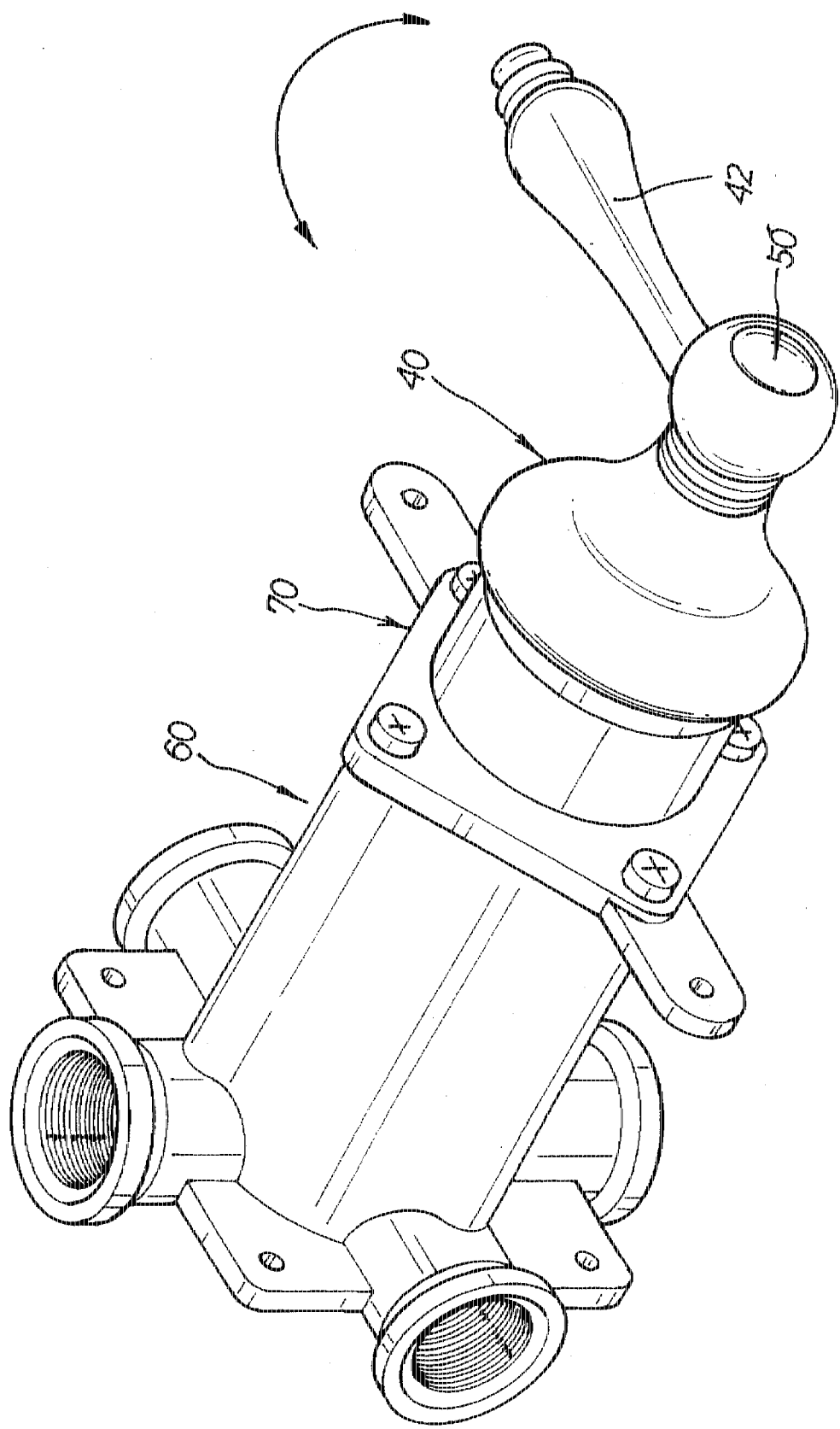
FIG. 3 is a completely assembled view of the present invention.
Figure 4A:
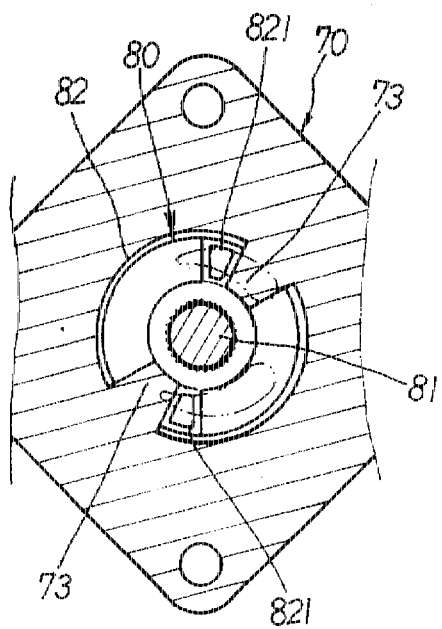
FIGS. 4A–4D are partially sectional views showing the opening/closing operations of the present invention.
Figure 4C:
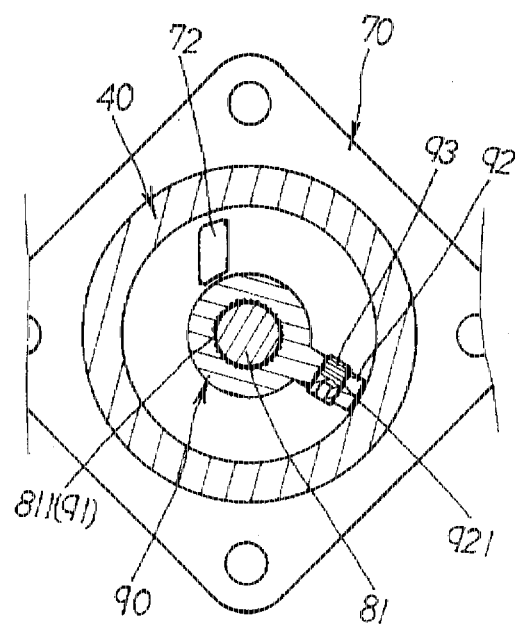
Figure 4B:
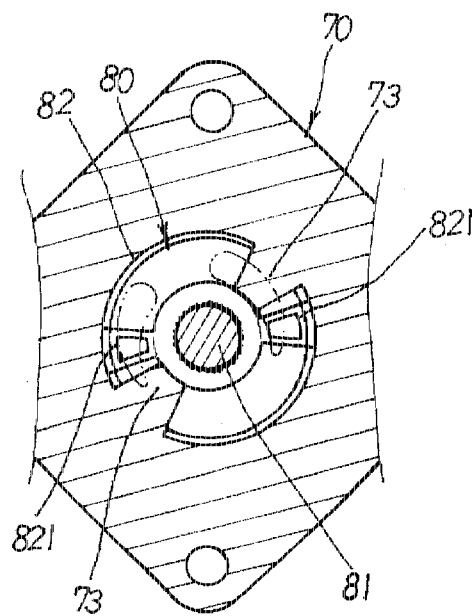
Figure 4D:
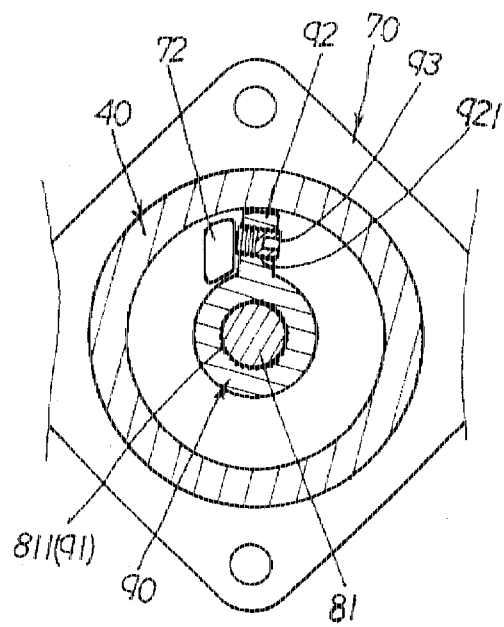

Referring to FIG. 3, the handle knob 40 is filled onto the front section of the stem 81 and a screw is screwed into the stopped hole 41 of the handle knob 40 with the head of the screw abutting against the step of the stepped hole 41 and secured in the thread hole 812 of the stem 81. Then the decorative cap 50 is fitted into the stepped hole 41 of the handle knob 40 to complete the assembly.

When not used, the handle 42 is clockwise rotated to the dead end, making the two restricting blocks 821 abut against the two projecting blocks 73 of the cover member 70 (referring to FIGS. 4A-4D) so as to shut off the water. In use, the handle 42 is counterclockwise rotated to the dead end, making the temperature setting projection 92 or the end of the adjustment bolt 93 abut against the right side of the engaging block 72 so as to discharge the water at predetermined temperature.

According to the above arrangement, the present invention has the following advantages:

1. The restricting ribs 911 of the fitting hole 91 of the temperature setting sleeve 90 are engaged with the restricting ribs 8111 of the fitting section 811 of the stem 81 so as to locate the same, whereby the temperature setting projection 92 can directly contact with the right side of the engaging block 72 so as to easily directly set the necessary temperature of the discharged water without considering whether the adjustment bolt 93 is loosened.

2. In the case that the restricting ribs 911 of the fitting hole 91 of the temperature setting sleeve 90 are engaged with the restricting ribs 8111 of the fitting section 811 of the stem 81 by such an angle as not to contact with the right side of the engaging block 72 of the cover member 70, a user only needs to microadjust the adjustment bolt 93 through a small distance so as to quickly set the temperature of discharged water.

Once the adjustment bolt 93 is collided by the engaging block 72 and loosened, when the temperature setting projection 92 is further advanced to increase the water temperature, the projection 92 is only moved forward through a small distance and stopped by the right side of the engaging block 72 so that the water temperature will be not excessively increased so as to avoid scading of the user.

The above embodiment is only an example of the present invention and the scope of the present invention should not be limited to the example. Any modification or variation derived from the example should fall within the scope of the present invention.

What is claimed is:

1. A water temperature setting structure of combination faucet, comprising a combination faucet body, a cover member, a controlling valve, a temperature setting sleeve, an adjustment bolt, a handle knob and a decorative cap, wherein the front face of the cover member is formed with a central through hole and the head section of the stem of the controlling valve is disposed with a thread hole, the head section of the handle knob being disposed with a stepped hole, a handle extending from a lateral side of the handle knob, said structure being characterized in that:

an engaging block is disposed above the through hole, a middle step of three steps of rear face of the cover member being disposed with two opposite projecting blocks;

a middle section of the valve stem of the controlling valve is disposed with a fitting section formed with multiple axial restricting ribs, a rear end of the stem being connected with a cold/hot water combination chamber a top face of which is disposed with two opposite restricting blocks;

a center of the end face of the temperature setting sleeve is disposed with a fitting hole an inner wall of which is formed with multiple axial restricting ribs, a temperature setting projection extending from the periphery of the temperature setting sleeve, which is formed with a thread hole on lateral side, whereby the stem is first passed through the through hole of the cover member to fit therewith, the two restricting blocks of the controlling valve being interlacedly positioned between the two projecting blocks of the rear end of the cover member so as to preliminarily determine the proper travel range for measuring the desired water temperature, then the stem being further moved within the proper travel range so as to quickly rotate the handle to the necessary temperature of the discharged water, then the handle knob being extracted from the stem and the fitting section of the stem being fitted into the fitting hole of the temperature sleeve by such an angle as to contact with right side of the engaging block of the cover member, the restricting ribs of the fitting hole being engaged with the restricting ribs of the fitting section to locate the same, the temperature setting projection contacting with or being positioned at a position closest to the right side of the engaging block, in case the projection does not contact with the right side of the engaging block yet, the adjustment bolt being microadjusted with its rear end abutting against the right side of the engaging block, in use, the handle being counterclockwise rotated to the dead end so as to discharge the water at predetermined temperature, in the case that the setting is not completed yet, a user only needing to microadjust the adjustment bolt through a small distance so as to quickly set the temperature of discharged water, once the adjustment bolt being loosened, the temperature setting projection being only moved forward through a small distance and stopped by the right side of the engaging block so that the water temperature will be not excessively increased so as to avoid scading of the user.

2. A water temperature setting structure as claimed in claim 1, wherein the number of the restricting ribs of the fitting section of the stem and the number of the restricting ribs of the fitting hole of the temperature setting sleeve are equal to each other.

3. A water temperature setting structure as claimed in claim 1, wherein the more the restricting ribs of the fitting section of the stem and the restricting ribs of the fitting hole of the temperature selling sleeve are, the smaller the angle contained by two restricting ribs is, whereby after each selection of water temperature, the locating projection of the temperature setting sleeve contacts with the right side of the engaging block of the cover member by higher accuracy without further adjusting the adjustment bolt.

* * * * *